United States Patent
Jacobs et al.

[11] Patent Number: 5,816,519
[45] Date of Patent: Oct. 6, 1998

[54] AUTOMATIC TAPE GUIDE ARM WITH THREE DIMENSIONAL RANGE OF MOTION AND METHOD OF OPERATING THE SAME

[75] Inventors: Lynn C. Jacobs, Berthoud; Donovan M. Janssen, Boulder; Joe K. Jurneke, Brighton; Matthew P. Wojciechowski, Louisville, all of Colo.

[73] Assignee: Storage Technology Coproration, Louisville, Colo.

[21] Appl. No.: 904,512

[22] Filed: Aug. 1, 1997

[51] Int. Cl.[6] ........................................ G03B 1/02
[52] U.S. Cl. .......................... 242/332.4; 242/332
[58] Field of Search .................. 242/332, 332.3, 242/332.4, 332.7, 348.3; 226/91, 92; 360/95

[56] References Cited

U.S. PATENT DOCUMENTS

| | | | |
|---|---|---|---|
| 3,818,503 | 6/1974 | Hosono et al. | 242/332 |
| 4,399,936 | 8/1983 | Rueger | 242/332.4 |
| 5,224,641 | 7/1993 | Spicer | 226/97 |
| 5,374,003 | 12/1994 | Hoge et al. | 242/332.7 |

OTHER PUBLICATIONS

Technical Guide, vol. 1–2, AJ–D360, Panasonic/Matsushita Electrical Industrial Co., Ltd., Audio and Video Systems Division.

*Primary Examiner*—John P. Darling
*Attorney, Agent, or Firm*—Duft, Graziano & Forest

[57] ABSTRACT

A tape threading apparatus (20) includes a tape guide arm (22) having a spring-biased elbow (32). The arm (22) is coupled for rotation with a rotatable shaft (24). The shaft is provided with a barrel cam (76, 92) for a third dimension of movement. A drive mechanism includes two gears (88, 90) that overlap to permit vertical slippage in the third dimension of movement. An arm guide cam slot (102) provides a directional orientation for movement of the arm (22) along a tape travel pathway (100).

16 Claims, 3 Drawing Sheets

AUTOMATIC TAPE GUIDE ARM WITH THREE DIMENSIONAL RANGE OF MOTION AND METHOD OF OPERATING THE SAME

BACKGROUND OF THE INVENTION

1. Field of the Invention

The present invention pertains to the field of magnetic or optical tape data storage subsystems. More specifically, the data storage subsystems include guide arms having multiple dimensions of movement for use in loading new tape cartridges to be accessed by an information processing system.

2. Description of the Prior Art

Mechanical arms for use in tape-threading systems are typically limited by a two dimensional range of motion, i.e., the arms operate in a single plane. The use of a two dimensional arm is inappropriate where the tape must be threaded in three dimensions. Devices that thread tape in three dimensions have traditionally utilized other remote synchronous mechanisms in addition to the guide arm assembly.

Guide arms for use in threading tape storage media are known in the art, however, these guide arms typically lack the ability to move in three dimensions. U.S. Pat. No. 5,219,129 depicts a mechanical arm having a two dimensional range of motion that draws tape across a horseshoe-shaped arc for insertion into a takeup spool. All segments of the guide arm move in essentially the same plane all through the guide arm range of motion.

The threading of tape along a three dimensional pathway requires the use of additional complicated mechanisms in combination with the guide arm. For example, U.S. Pat. No. 5,374,003 describes a system that utilizes a linear belt-driven guide arm having a two dimensional range of motion. While the 5,374,003 patent represents a significant advance in the art, the threading of tape along a three dimensional pathway around a helical scanner requires the addition of a separate mechanism for lowering the tape into an aligned position between several upright tape guides. These additional guides subsequently wrap the tape around a helical scan mechanism.

Helical scanning drums, as in the 5,374,003 patent, are particularly difficult to thread with a single mechanical arm. These difficulties exist because the tape is preferably wrapped around a majority of the outer circumference of the rotary drum, and the tape-travel pathway declines at an angle. Helical scanning drums provide for high density storage, but also require exacting tolerances. These types of drums are most commonly utilized in video tape machines, but have other mass storage uses as well. The typical video tape system recording pathway is a tortuous pathway that supplies tape from a dual spool video cartridge to a helical scanning drum. A rotary gear-driven platform having a plurality of guideposts draws the tape in an almost complete 360° arc, reverses direction through a radially inboard situs, completes another bend through an approximate 300° arc around the scanner, and bends 90° for a return to the cartridge. One example of this type of video system pathway is described on page 11 of the *Panasonic Technical Guide AJ-D350*. These long, tortuous pathways are undesirable from the standpoint of tape stretch, tape wear, stiction, and tracking control. In video systems, the errors that derive from these problems are usually not catastrophic, however, these same types of errors can cause significant problems in other mass data storage systems.

There remains a need for a tape threading guide arm having a three-dimensional range of motion around a simplified tape travel pathway in helical scanning apparatus.

SUMMARY OF THE INVENTION

The present invention overcomes the problems that are outlined above by providing a tape-threading guide arm having a three dimensional range of motion around a simplified tape travel pathway for use in helical scanning apparatus. The three-dimensional guide arm may also be utilized in other apparatus that requires a three-dimensional range of motion.

The present three-dimensional tape threading apparatus includes a rotatable elongated shaft presenting a central axis of rotation. A guide arm is connected to the shaft for rotation with the shaft, and includes a first portion having a tape holder. The shaft is connected to a shaft-mounted gear that is driven to rotate concentrically with the shaft. The shaft, in turn, rotates the guide arm. The preferred driven gear is actuated by an input gear. At least one of the two gears is preferably elongated along its axis of rotation to permit the gears to remain engaged despite a sliding motion of the shaft-mounted driven gear relative to the input gear. The sliding motion is caused by a barrel cam that shifts the shaft in a direction parallel with the axis of shaft rotation to provide a third dimension of movement in addition to the rotary motion of the guide arm. The barrel cam preferably includes a cam groove that is cut into the shaft perimeter, and a camming projection that engages the groove. Rotation of the elongated shaft around its axis of elongation also serves to shift the shaft longitudinally by the interaction of the camming projection and the cam groove.

In preferred embodiments, the two portions of the guide arm are made of different segments that are joined by a pivot to form an elbow. The pivot preferably has its own axis of rotation running parallel with the axis of rotation in the shaft. An arm guide cam slot preferably descends along the path of travel for the outer portion of the arm, and is mounted in a fixed position relative to the path of travel. The arm guide cam slot serves to move the tape holder to a plurality of different distances from the shaft concomitant with rotation of the shaft. A spring is used to bias the guide arm into engagement with the arm guide cam slot.

The shaft is mounted proximal to a three-dimensional tape-travel pathway that provides directional orientation for threading operations across a helical scanning drum. Movement of the guide arm is used to thread tape through the pathway by connecting tape from a tape cartridge to the guide arm, rotating the shaft to pass the tape guide arm around the helical scanning or recording drum to dispose tape around the drum, and camming the shaft simultaneously with rotation of the shaft to displace the shaft in a direction parallel with the axis of rotation.

Other features, objects, and advantages of the present invention will be apparent to those skilled in the art upon a review of the discussion below in addition to the corresponding drawings.

DETAILED DESCRIPTION OF THE PREFERRED EMBODIMENT

Figure 1:
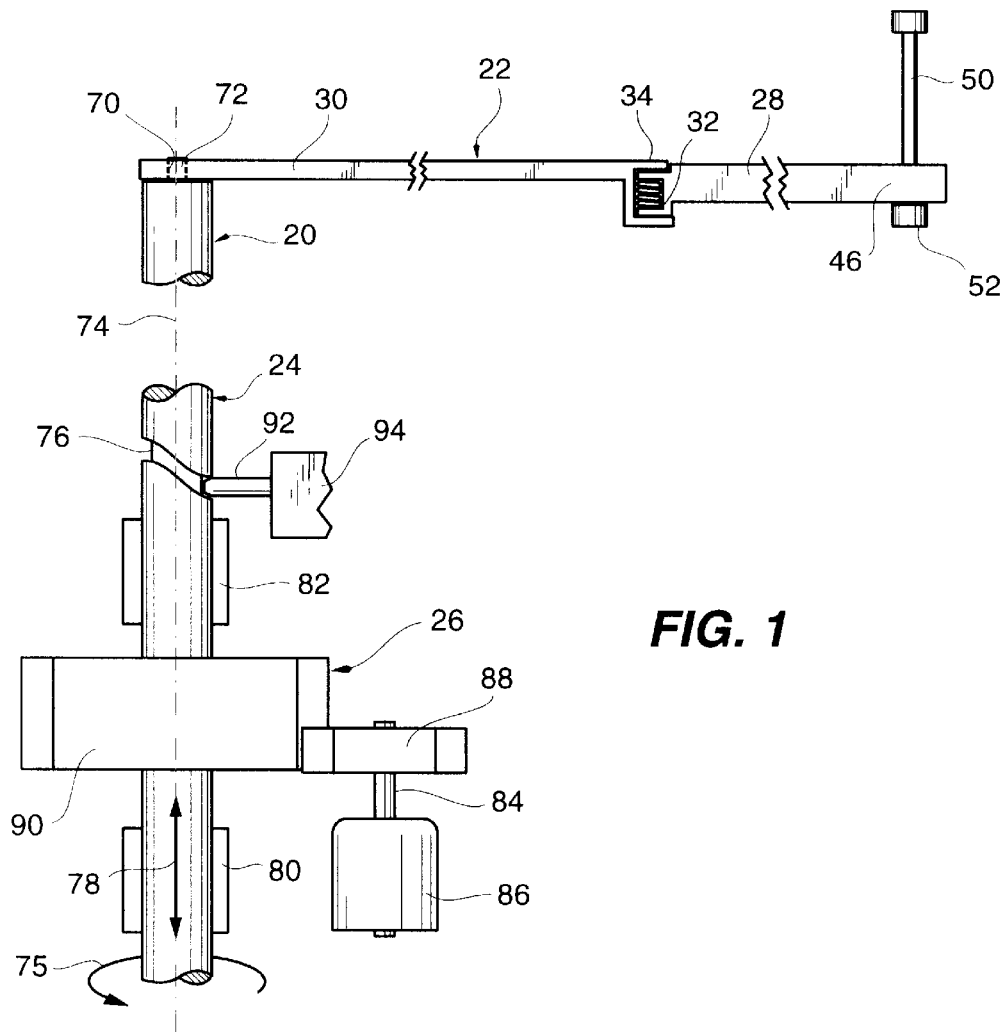
FIG. 1 depicts a front elevational view of a tape threading guide arm assembly according to the present invention.

FIG. 1 depicts a tape-threading guide arm assembly 20, which is used to thread tape along a three-dimensional pathway. The major components of assembly 20 include hinged guide arm 22, a central rotatable shaft 24, and rotary drive mechanism 26. Drive mechanism 26 imparts rotary motion to shaft 24 which, in turn, is cammed up and down to impart a three-dimensional range of motion to arm 22 concomitant with rotation of the shaft.

Figure 2:
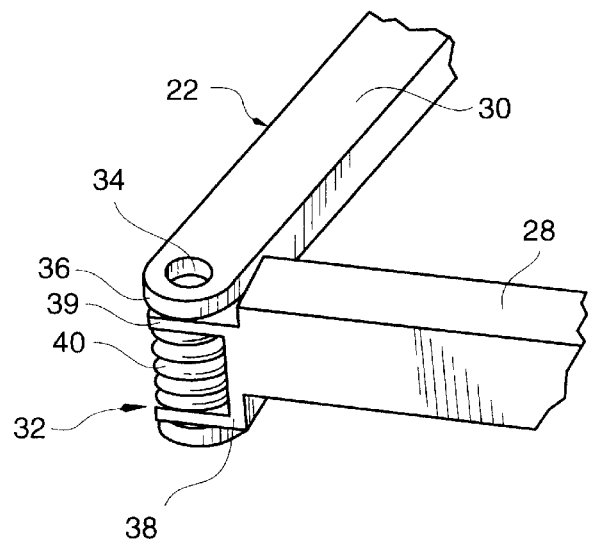
FIG. 2 depicts a left rear perspective view of a spring-biased elbow for use in the guide arm assembly of FIG. 1.

FIG. 2 provides additional detail with respect to arm 22. Guide arm 22 includes an elongated guide-holding segment 28 and an elongated motive segment 30, which are joined at elbow 32 by pin 34 (see FIGS. 1 and 2). Segments 28 and 30 have respective channel ends 36 and 38, with the legs (e.g., leg 39) of the respective channels being apertured to receive pin 34, which is fixedly attached to segment 28. Tensed coil spring 40 surrounds pin 34, and is preferably coupled with pin 40 and leg 39 to bias the remote ends of segments 28 and 30 towards one another in the direction of rotation.

Figure 3:
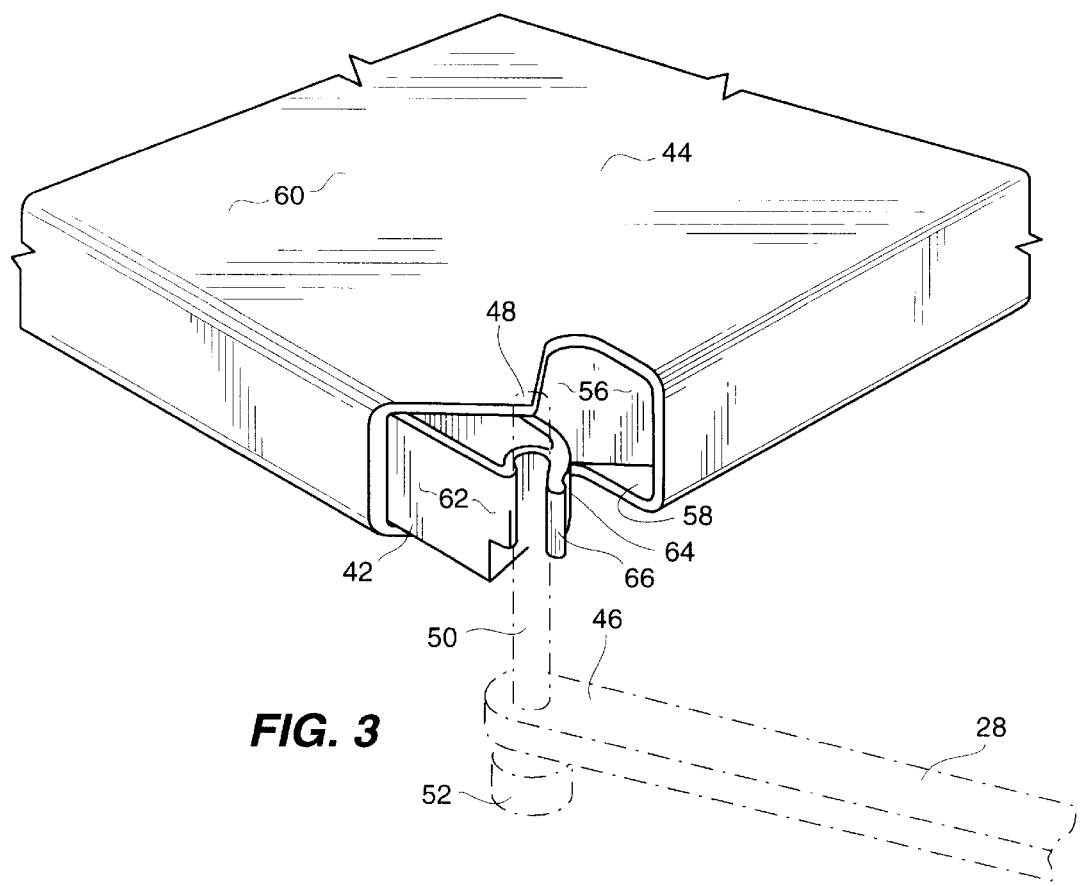
FIG. 3 depicts a broken left front elevational perspective view of a tape leader block connector for use with the FIG. 1 assembly.

FIG. 3 depicts a partial left front perspective elevational view of the guide arm assembly 20 in use as part of an automated tape-loading system. FIG. 3 shows a positional reference for guide-holding segment 28 as it is being inserted into a leader block 42 of a conventional single-spool tape cartridge 44. Guide-holding segment 28 includes a rounded apertured end 46 at a position remote from elbow 32 (see FIG. 2). Leader block connector 48 passes through the aperture in end 46, and includes a central cylindrical post 50 having a lower cylindrical cap 52 of an increased diameter relative to post 50. Cartridge 44 preferably contains a single spool of tape 56 within an interior cavity 58 defined by marginal plastic cartridge wall structure 60 (wall 60 is partially cut away as depicted in FIG. 3 to reveal tape 56 and cavity 58).

Leader block 42 is attached to tape 56, and is used to draw spooled tape 56 from within cavity 58. Block 42 is preferably made of a flexible synthetic resin. A forwardmost, distal, post-receiving curve is formed at the intersection of an outboard flat wall 62 and inboard concave-out flexible wall 64. Flexible forward lip 66 can deform to accommodate post 50.

FIG. 1 is used to illustrate arm segment 30 and its preferred connective relationship with other parts. Female rectangular slot 70 fixedly accommodates a male rectangular member 72 of shaft 24 for rotation therewith. Shaft 24 is preferably an elongated cylinder having a central axis of rotation 74. The direction of rotation is indicated by arrow 75. Axis 74 preferably has a parallel orientation with respect to the longitudinal axes of pin 34 and post 50. Shaft 24 has a quasihelical barrel cam groove 76 cut into its outer perimeter. This groove varies in elevation to provide Z-axis or vertical movement as required in the direction of arrow 78 concomitant with rotation of shaft 24 around axis 74. Roller bearing bushings 80 and 82 serve to mount shaft 24 for rotation within supportive wall structure (not depicted in FIG. 1).

FIG. 1 also depicts a rotary drive mechanism 26. Shaft 84 of electric motor 86 rotates input gear 88 which, in turn, rotates driven gear 90. Motor 86 is preferably a stepper motor or a series wound motor. Gear 90 preferably has an increased diameter with respect to gear 88. Gear 90 is keyed to shaft 24, and rotates shaft 24 responsive to power from gear 88. Gear 90 is preferably elongated along its axis of rotation to accommodate vertical shifting motion of shaft 24 with respect to gear 88 while remaining in contact with gear 88. Cam pin 92 extends outwardly from a fixed position with respect to supportive wall structure 94 to engage cam groove 76 of shaft 24. Motor 86 is firmly mounted to a frame or other supportive surrounding structure (not depicted in FIG. 1) that facilitates the transfer of rotary motive force to shaft 24.

Figure 4:
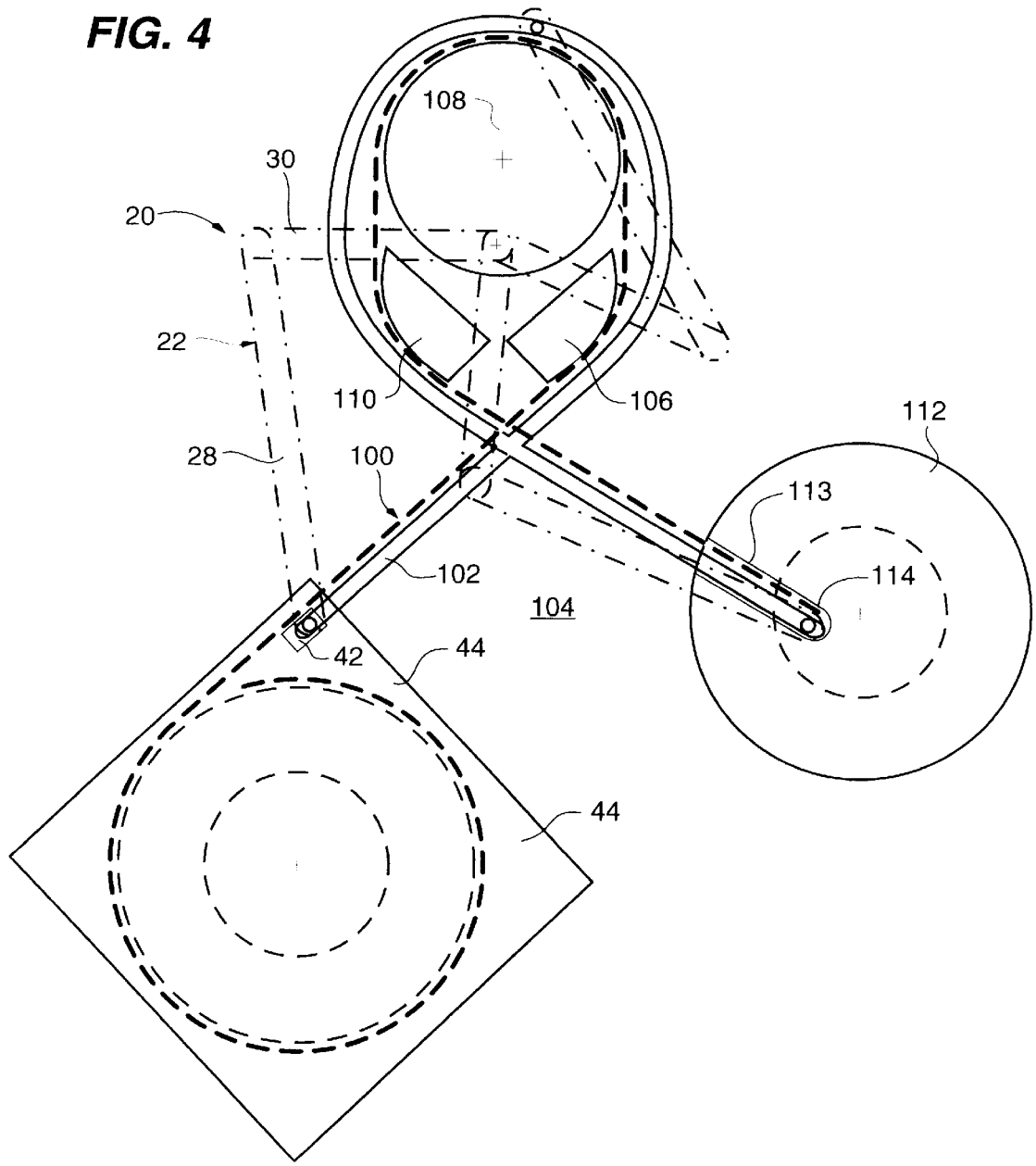
FIG. 4 depicts a top plan view of the FIG. 1 apparatus deployed in a tape travel pathway for use in a helical scanning system.

FIG. 4 depicts assembly 20 in an operational position along a preferred tape travel pathway 100 for use in helical scanning apparatus. Pathway 100 begins at tape cartridge 44, and proceeds downwardly along an arm guide cam slot 102 that is cut into frame plate 104 towards first air bearing 106. Cam slot 102 is designed to force movement of post 50 to different distances or radii from shaft 24 along pathway 100 concomitant with rotation of shaft 24. Frame plate 104, accordingly, has a perpendicular orientation with respect to the axis of rotation 74 of shaft 24.

Figure 5:
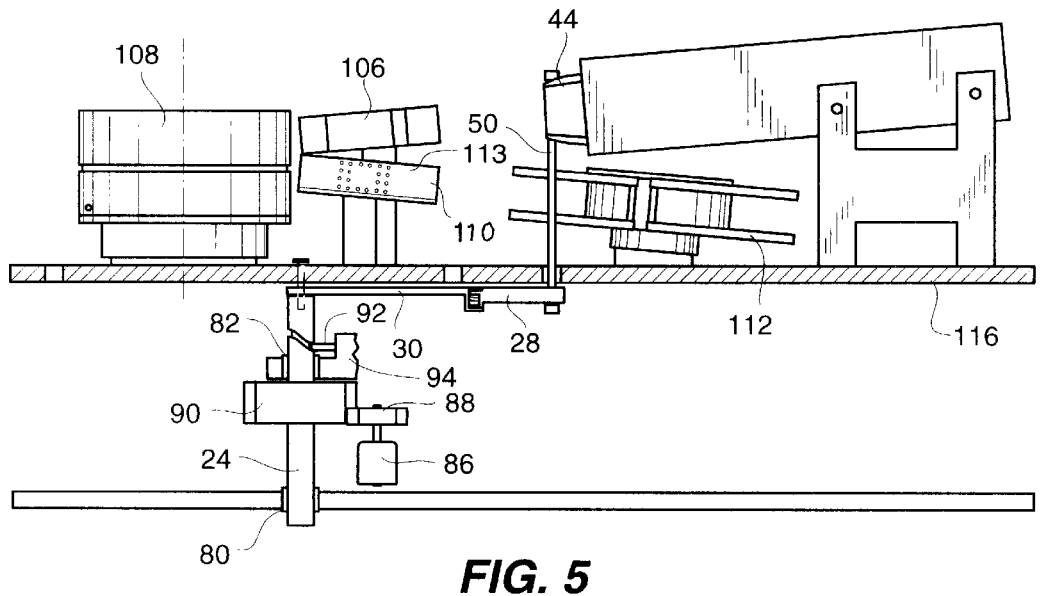
FIG. 5 depicts a left side view of the FIG. 4 system.

Pathway 100 turns almost 360° around rotatable helical scanning drum 108 to second air bearing tape guide 110, and continues its decline along guide cam slot 102 to take-up spool 112. Spool 112 has a conventional leader block-receiving notch 114 where leader block 42 resides at the terminus of pathway 100. Arm 22 then moves post 50 downwardly to disengage post 50 from lip 66 (see FIG. 3) and prevent post 50 from interfering with the rotation of spool 112. Elbow 32 of assembly 20 is spring-biased to urge post 50 of segment 28 into sliding engagement with cam slot 102 all along pathway 100. FIG. 5 depicts the structural elements of pathway 100 in additional detail from a side perspective.

Air bearings 106 and 110 are conventional air bearings for use in tape guidance systems. Tape guidance air bearings are commercially available, however, they are not used in a three-dimensional pathway configuration like that of pathway 100. By way of example, U.S. Pat. No. 5,224,641 provides details of the construction and operation of tape-guidance air bearings. These air bearings use a source of gauge-positive pressurized air flowing through a perforated wall, e.g., wall 113, to reduce friction between the tape and the wall.

Helical scanning drum 108 is also conventional. An exemplary scanning drum 106 for use with the present invention is described in the *Technical Guide AJ-D350* for a video tape recording system which is manufactured by Matsushita Electric Industrial Co., Ltd (Panasonic) of Japan. The drum may be purchased separately from the overall video recording system.

In operation, assembly 20 is mounted on a suitable housing, such as wall 116 of a video system. A tape-threading sequence of system control logic causes motor 86 to drive input gear 88 and driven gear 90 for the rotation of shaft 24 and arm 22. Groove 76 rides pin 92 to provide a third dimension or Z-axis range of motion concomitant with the rotation of shaft 24. This change in elevation mimics the decline of post 50 (FIG. 3) across pathway 100. Post 50 is rotated into engagement with leader block 42 as depicted in FIG. 3. Arm 22 is then rotated along pathway 100 through the various sequential positions depicted in FIG. 4, with elbow 32 urging post 50 into engagement with cam 102 slot. The rotation of arm 22 terminates with leader block 42 connected to spool 112 in a conventional manner at the end of pathway 100. Arm 22 then falls downwardly through the interaction of groove 76 and pin 92 to remove post 50 from leader block 42.

The above-described operational characteristics are particularly advantageous when the cartridge 44 is robotically manipulated. For example, a central tape library can be made to supply a host system with data from a selected one of a plurality of tapes in the library.

Those skilled in the art will understand that the preferred embodiments described hereinabove may be subjected to apparent modifications without departing from the scope and spirit of the invention. Accordingly, the inventors hereby state their full intention to rely upon the Doctrine of Equivalents, in order to protect their full rights in the invention.

What is claimed is:

1. A tape threading apparatus for moving tape through three dimensions, comprising:

a rotatable shaft presenting an axis of rotation;

a guide arm including a first end having a tape holder and a second end connected to said shaft for rotation therewith; and means for rotating said shaft and said guide arm around said axis of rotation, and for shifting said shaft and said guide arm in a direction parallel with said axis of rotation concomitant with rotation of said shaft.

2. The apparatus as set forth in claim 1, including a first segment bearing said first end and a second segment bearing said second end, and a pivot connecting said first end with said second end.

3. The apparatus as set forth in claim 2, including said pivot having a longitudinal axis running parallel with said axis of rotation.

4. The apparatus as set forth in claim 1, including an arm guide cam and means mounting said arm guide cam in a fixed position.

5. The apparatus as set forth in claim 4, said arm guide cam including means for moving said tape holder to a plurality of different distances from said shaft concomitant with rotation of said shaft.

6. The apparatus as set forth in claim 5, said guide arm including spring means for biasing said arm into contact with said cam.

7. The apparatus as set forth in claim 6, said spring means including a coiled spring.

8. The apparatus as set forth in claim 1, said rotating means including a driven gear coupled with said shaft for concentric rotation therewith.

9. The apparatus as set forth in claim 8, said rotating means including an input gear contacting said driven gear, said driven gear being slidable relative to said input gear in a direction parallel with said axis of rotation.

10. The apparatus as set forth in claim 1, said shifting means including said shaft having a barrel cam groove at least partially circumscribing said shaft at an outermost circumference of said shaft over a region of said shaft coextending with said axis.

11. The apparatus as set forth in claim 10, said shifting means including a fixed pin connected to a support base and engaging said barrel cam.

12. The apparatus as set forth in claim 1, including an arm guide cam having a substantially continuous guide arm-contacting surface passing through a plane perpendicular to said axis of rotation.

13. The apparatus as set forth in claim 1, including a rotatable head mounted on a support base and presenting a head rotational axis.

14. The apparatus as set forth in claim 13, said head rotational axis extending at an oblique angle relative to said axis of rotation.

15. The apparatus as set forth in claim 14, including an arm guide cam coupled with said support base, said cam providing means for directing said tape holder along a path circumscribing said head.

16. A method of operating a tape threading apparatus, said method comprising the steps of:

providing apparatus including a tape source, a recording head, and a rotatable shaft coupled with a tape guide arm extending outwardly from said shaft, said shaft having an axis of rotation;

connecting tape from said tape source to said tape guide arm;

rotating said shaft to pass said tape guide arm around said recording head to dispose tape around said recording head; and camming said shaft simultaneously with said rotating step to displace said shaft in a direction parallel with said axis of rotation.

* * * * *